3,652,668
PROCESS FOR THE OXIDATION OF
HYDROCARBONS
Derek Bryce-Smith, Sonning Common, near Reading, and Stuart Samuel Adcock, Reading, England, assignors to Ethyl Corporation, New York, N.Y.
No Drawing. Filed Dec. 6, 1966, Ser. No. 599,382
Claims priority, application Great Britain, Apr. 15, 1966, 16,641/66
Int. Cl. C07c 47/54, 63/02, 69/14
U.S. Cl. 260—524 R           11 Claims

ABSTRACT OF THE DISCLOSURE

Oxidation of non-acetylenic hydrocarbons, particularly alkyl aromatics, with molecular oxygen using a catalyst system composed of a silver substance (e.g., silver acetate) and a carboxylic acid anhydride (e.g., acetic anhydride). Small amounts of fluorine containing substances (e.g., silver fluoride) are preferably present.

This invention relates to a process for the oxidation of hydrocarbons and in particular to the oxidation of non-acetylenic hydrocarbons with molecular oxygen and a metallic oxidation catalyst.

Numerous processes for oxidizing non-acetylenic hydrocarbons with molecular oxygen, e.g., gaseous oxygen, air, or air enriched with oxygen, and a catalyst have been described—see, for example, British Pat. Nos. 807,091, 910,484 and 1,007,570. In addition, see U.S. Pats. Nos. 2,223,493, 2,223,494, 2,223,500, 2,245,528, 2,265,948, 2,588,388, 2,589,648, 2,673,217, 2,675,407, 2,704,294, 2,802,859, 2,962,361, 3,064,044, 3,076,842; and Canadian Pat. No. 722,726. A common feature of the prior art processes is the use of a metallic oxidation catalyst usually in the form of an organic compound or an inorganic compound, e.g., a salt or an oxide. Although catalysts consisting of derivatives of virtually every metal of the Periodic Table have been used, the most highly recommended catalysts are derivatives of cobalt and manganese, and a few other polyvalent metals. The conjoint use of bromine or bromine compounds or other reaction promotors or initiators is also often recommended. Although described reaction media vary, acetic acid or a related organic acid is now generally favored as the reaction medium.

Among recognized shortcomings of many of these prior art processes are the corrosiveness of various catalyst systems (especially those in which bromine or bromine-containing ingredients are used), the loss of process efficiency or catalyst activity by virtue of the presence of water or alcohols in the system (reaction products of hydrocarbon oxidation), and the excessive induction periods.

According to the present invention there is provided a process for the oxidation of hydrocarbons or hydrocarbon groups, which process comprises oxidizing one or more non-acetylenic hydrocarbons or other organic compounds containing a non-acetylenic hydrocarbon group or groups with molecular oxygen in the presence of a carboxylic acid anhydride and silver, or a silver compound such as silver oxide, or a silver salt as catalyst.

In the process of the invention the acid anhydride is believed to contribute to the efficacy of the process in several ways. Experimental work has shown that in the absence of an acid anhydride the silver catalysts have little or no activity—in the case of methyl benzenes (e.g., toluene)—virtually no oxidation occurs at temperature up to from 115° C. to 118° C. even when using oxygen gas. However, this oxidation initiates and proceeds readily when an acid anhydride, e.g., acetic anhydride, is also present in the reaction system. Furthermore, the anhydride tends to react with water or any alcohol by-products essentially as soon as they are formed and because of this, the catalyst is not appreciably deactivated and the efficiency of the process is not materially impaired. Moreover, the anhydride reaction promoter and its products of reaction are far less corrosive to metallic reaction equipment than the bromine and bromine-containing promoters used heretofore.

The reaction mixtures of the process of the invention are normally yellow in color. As it has been observed that silver salts such as silver acetate react with acetic anhydride in the absence of hydrocarbons to give a yellow complex of unknown constitution, it is thought that a complex of this type may constitute the active catalyst in processes in accordance with the invention. It will be understood therefore that in those cases where the complex is isolatable, the invention includes processes carried out with the complex, rather than the acid anhydride and silver or silver compound, as an initial starting material.

The process of the invention may be used to oxidize various types of non-acetylenic hydrocarbons such as alkyl aromatic hydrocarbons, olefins, e.g., α-olefins, paraffins, cycloparaffins, and cycloolefins.

The process of the invention may also be used to oxidize one or more hydrocarbon groups which form part of an organic compound which in itself is not a hydrocarbon by virtue of the fact that it contains a functional group or groups such as an ester group or halogen, e.g., a chlorine atom. It will be understood, however, that in such cases the remainder of the molecule should be inert to oxidation.

The process of the invention is especially suitable for the oxidation of alkyl aromatic hydrocarbons, especially the methyl benzenes, e.g., toluene, the xylenes, and the trimethyl benzenes, and α-olefins (1-alkene hydrocarbons) such as 1-octenes, 1-nonenes, 1-decenes, 1-dodecenes, 1-tetradecenes, 1-hexadecenes, and 1-octadecenes.

The process of the invention is preferably carried out in the liquid phase in which case the acid anhydride or the hydrocarbon or the other compound to be oxidized may be the reaction medium. A separate inert reaction medium may be used if desired.

Alternatively, the or each hydrocarbon or other organic compound and the acid anhydride may be contacted in the gas phase with a solid silver containing catalyst in the presence of oxygen with or without an inert diluent such as nitrogen.

The metal or metal-containing component of the catalyst used in the process of the invention may be silver or a silver compound such as silver oxide, or a silver salt. A mixture of silver salts, or a mixture of silver and silver oxide or one or more salts may be used if desired.

When metallic silver is used as the catalyst in the process of the invention it is preferably in a finely divided form. When the process is carried out in the liquid phase, it is preferred to use a silver salt or a mixture of silver salts because the salts are usually at least partially soluble in the reaction medium. By proper selection of silver salt it is possible to conduct the process in an essentially homogenous system. A variety of silver salts may be used in the process of this invention, exemplary materials being silver nitrate, silver fluoride, silver borofluoride, silver hexafluorophosphate, and silver salts of carboxylic acids such as silver acetate, silver propionate, silver butyrate, silver chloroacetate, silver trichloroacetate, silver trifluoring silver nitrate, silver fluoride, silver borofluoride, silver silver salt of ethylene diamine tetraacetic acid.

In a preferred embodiment of the process of this invention the process is carried out in the presence of a minor proportion of fluorine in chemically combined form. This may be achieved by using, for example, silver fluoride, silver hexafluorophosphate, or silver borofluoride or silver acetate in admixture with a trace of trifluoroacetic acid.

Although a wide variety of carboxylic acid anhydrides may be used in the process of this invention, it is preferred to use the reactive acid anhydrides of the formula $(RCO)_2O$, wherein R is a lower alkyl group, as these tend to react more readily with the water formed during the course of the oxidation reaction. Examples of these anhydrides are acetic anhydride, propionic anhydride, butyric anhydride, isovaleric anhydride, caproic anhydride, and palmitic anhydride. It is especially preferred to use acetic anhydride.

The proportion of silver or silver salts catalyst used in the process of the invention may be varied widely, depending, for example, on such factors as the identity of the catalyst employed, the nature of the hydrocarbon or hydrocarbons oxidized, the reaction temperature used, and the form and mode of introduction of the molecular oxygen. In general there is used from 0.0001 to 1 gram atom of silver per gram mole of non-acetylenic hydrocarbon. The proportion of anhydride used in the process of the invention may also be varied widely. In general it is desirable to use sufficient acid anhydride to form the above-mentioned complex, i.e., at least 1 or 2 gram moles of anhydride per gram atom of silver present. This ratio may, however, range as high as 500 to 1, or even higher if desired.

Elevated temperatures enhance the rate of the oxidation reaction and thus temperatures of from 100° C. to 150° C. or higher are preferably used. The reaction system may be maintained at atmospheric pressure although if desired elevated pressures, e.g., as high as 200 atmospheres, may be used.

When the process of the invention is carried out in the liquid phase, the molecular oxygen, e.g., air, gaseous oxygen or air enriched with gaseous oxygen, is preferably introduced direcetly into the liquid reaction system although it is entirely feasible to agitate the reaction system in an oxygen-containing atmosphere.

The present invention includes a catalyst composition suitable for use in the oxidation of non-acetylenic hydrocarbons with molecular oxygen comprising silver, or a silver compound such as silver oxide, or a silver salt and a carboxylic acid anhydride.

Following is a description by way of example to further illustrate processes in accordance with the invention.

EXAMPLE I

Oxygen was continuously bubbled through a reaction system initially composed of 60 ml. toluene, 30 ml. acetic anhydride and 0.60 g. silver acetate while refluxing the mixture at 116.5° C. and atmospheric pressure.

After one hour's refluxing the reaction mixture consisted of a yellow solution and a grey-white solid. Refluxing was continued for 72 hours. Then the solution was cooled and filtered. The solid left was $CH_3CO_2Ag$ (0.53 g.).

The excess toluene and acetic anhydride were distilled off under water pump pressure to leave a brown solution and a yellow-grey solid. The solid was filtered off and found to contain silver.

The brown solution was distilled at 5 mm. of Hg to give two fractions which both smelt strongly of benzyl acetate.

(1) 20–45° C. wt.=1.65 g. From V.P.C., ca. 60% benzyl acetate.
(2) 45–80° C. wt.=0.83 g. From V.P.C., ca. 40% benzyl acetate.

Therefore about 1.3 g. of benzyl acetate was present in the reaction product.

The residue was sublimed to give 0.02 g. of white solid whose infrared spectrum was identical with that of benzoic acid.

M.P.=120–121° C.
Mixed M.P.=120–121° C.

The two fractions were combined and a methanolic solution of 2,4-dinitrophenyl hydrazine added. This gave a red precipitate which was filtered off, washed with dilute $H_2SO_4$, methanol and dried.

M.P. of derivative=244–250° C.
M.P. of authentic derivative of benzaldehyde=245–250° C.
Mixed M.P.=244–250° C.

The weight of the derivative produced from the two fractions was 0.068 g., showing that 0.025 g. of benzaldehyde had been formed in this reaction.

EXAMPLE II

The oxidation procedure of Example I was repeated with the exception that silver trifluoroacetate was substituted for the silver acetate in the initial reaction mixture. During the course of the reaction it was observed that the soluble silver trifluoroacetate was converted by metathesis into the less soluble silver acetate. The results were generally similar to those reported in Example I.

EXAMPLE III

A comparative reaction was carried out similar to Example I except that 25 ml. acetic acid were used in place of the acetic anhydride. Workup of the reaction product revealed trace quantities of benzaldehyde and benzoic acid but no benzyl acetate, thus illustrating the reaction promoting effect of the anhydride in processes in accordance with the invention.

EXAMPLE IV

A reaction system was formed from 40 ml. toluene, 20 ml. acetic anhydride and 0.20 g. silver borofluoride and the oxidation was carried out under the same conditions and for the same length of time as in Example I. After ¼ hour of refluxing all the catalyst had dissolved. After 24 hours the solution was yellow, after 48 hours, brown.

After 72 hours the solution was filtered hot to remove a slight black precipitate. The excess toluene and acetic anhydride was distilled off to leave a white solid smelling of benzyl acetate. This solid was dissolved in carbon tetrachloride and filtered. Inasmuch as $AgBF_4$ is fairly insoluble in $CCl_4$, this enabled the recovery of 0.11 g. of $AgBF_4$. The $CCl_4$ was removed and total weight of product was 8.30 g.

The solid product was dissolved in dilute NaOH, filtered to remove a deposit of silver and extracted with three 50 ml. portions of diethyl ether to remove the benzyl acetate and other by-products. The solid was recovered by acidifying the alkaline solution.

Wt. of extracted liquid=1.04 g.
Wt. of solid=7.16 g.
M.P. of solid=121–122° C.
Mixed M.P. of solid=120–121° C.

The liquid extracted as above was studied by vapor phase chromatography on an Antrarox CO/900 column (polar). It was found to consist of a mixture of three components; ca. 40% benzaldehyde, ca. 50% benzyl acetate and ca. 10% of a higher boiling compound (possibly benzylidene diacetate).

Thus this reaction gave 8 g. of product from 0.2 g. of catalyst. Pure benzoic acid (7.16 g.; 89.5% yield) was isolated and the remaining material was shown by V.P.C. analysis to be a mixture of benzyl acetate and benzaldehyde, the ratio of the two products being 5:1.

EXAMPLE V

An attempt was made to oxidize toluene as in Example IV but in the absence of acetic anhydride. No reaction occurred thus again showing the role of the anhydride in promoting processes in accordance with the invention.

EXAMPLE VI

The procedure of Example I was repeated except that the initial reaction mixture additionally contained a trace of trifluoroacetic acid. After a reaction time of 72 hours and product workup, the major product was found to be benzoic acid. Benzaldehyde and benzyl acetate were identified as minor components in the product. Thus by comparing the results of this example with those of Example I, it is seen that the presence of even trace quantities of chemically combined fluorine can beneficially affect the reaction where carboxylic acids are the desired product. Similar observations can be made with respect to the results of Example IV where an AgBF$_4$ catalyst, another fluorine-containing species was used.

EXAMPLE VII

A reaction involving octene-1, acetic anhydride and silver acetate gave 10 g. of product after 72 hours' refluxing. 5 grams of this was a single compound which analyzed for a diacetato derivative of octene-1 or octane. The N.M.R. was not fully conclusive as the sample used was not wholly pure; but it is in reasonable agreement with the structure:

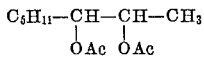

with possibly some

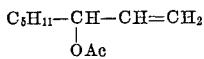

as an impurity. The sample was saturated to bromine, slightly unsaturated to KMnO$_4$ in acetone and very slowly adsorbed 0.88 mole of H$_2$ on hydrogenation with Pt/C in benzene. However, only about 0.4 mole of H$_2$ was adsorbed in an attempted hydrogenation with palladium on charcoal in ethanol.

It is interesting to note from this example that the α-olefin reactant was not appreciably degraded via chain scission—the initial 8-carbon atom chain remained intact. This is quite unlike the results reported in U.S. Pat. 3,076,842 where octene-1 was oxidized in acetic acid with a cobalt acetate-manganese acetate-ammonium bromide catalyst to form a product containing heptanoic acid and acetyl pentanoic acid.

EXAMPLE VIII

A reaction involving silver borofluoride (0.25 g.) acetic anhydride (excess) and p-xylene (excess) under oxygen gave 1.83 grams of p-toluic acid after 72 hours at 130° C. This reaction also produced 3.45 grams of a 1:1 mixture of 4-methyl-benzaldehyde and 4-methyl-benzyl-acetate.

EXAMPLE IX

Oxygen was passed without additional stirring for 72 hours through a mixture of 50 ml. of toluene, 25 ml. of acetic anhydride, and 0.31 g. of precipitated silver metal at a temperature of 117° C. to give 0.82 g. of benzoic acid, 0.34 g. of benzaldehyde, and 1.0 g. of benzyl acetate.

What is claimed is:

1. A process for the oxidation of hydrocarbons, or hydrocarbon groups, which process comprises oxidizing in the liquid phase one or more alkyl aromatic hydrocarbons with molecular oxygen in the presence of a carboxylic acid anhydride of the formula (RCO)$_2$O where R is a lower alkyl group and a silver substance selected from the group consisting of silver, silver oxide, and a silver salt as catalyst.

2. A process as claimed in claim 1 wherein the alkyl aromatic hydrocarbon is a methyl benzene.

3. A process as claimed in claim 2 wherein the methyl benzene is a xylene.

4. A process as claimed in claim 2 wherein the methyl benzene is toluene.

5. A process as claimed in claim 1 wherein the reaction is conducted in the liquid phase at a temperature of from about 100° C. to about 150° C., wherein said anhydride is acetic anhydride and wherein a small amount of silver fluoride, silver hexafluorophosphate, silver borofluoride or trifluoroacetic acid has been added to the reaction system.

6. A process as claimed in claim 1 wherein said anhydride is acetic anhydride.

7. A process as claimed in claim 1 when carried out at a temperature of from 100° C. to 150° C.

8. A process as claimed in claim 1 when carried out in the presence of a minor proportion of fluorine in chemically combined form, the fluorine being introduced into the system in the form of silver fluoride, silver hexafluorophosphate, silver borofluoride or trifluoroacetic acid.

9. A process as claimed in claim 8 wherein the fluorine is present as trifluoroacetic acid.

10. A process as claimed in claim 1 wherein the silver substance is selected from the group consisting of silver fluoride, silver hexafluorophosphate, silver borofluoride, and silver nitrate.

11. A process as claimed in claim 1 wherein the silver salt is selected from the group consisting of silver acetate, silver propionate, silver butyrate, silver chloroacetate, silver trichloroacetate, silver trifluoroacetate, silver bromoacetate, silver benzoate, and the silver salt of ethylene diamine tetraacetic acid.

References Cited

UNITED STATES PATENTS

| | | | |
|---|---|---|---|
| 1,694,122 | 12/1968 | Jaeger | 260—524 |
| 2,245,528 | 6/1941 | Loder | 260—524 |
| 2,316,604 | 4/1943 | Loder et al. | 260—488 |
| 2,727,919 | 12/1955 | Saunders | 260—524 |
| 3,162,683 | 12/1964 | Jones et al. | 260—524 |

LORRAINE A. WEINBERGER, Primary Examiner

R. S. WEISSBERG, Assistant Examiner

U.S. Cl. X.R.

252—426, 430; 260—488 CD, 497 R, 599

UNITED STATES PATENT OFFICE
CERTIFICATE OF CORRECTION

Patent No. 3,652,668          Dated March 28, 1972

Inventor(s) Derek Bryce-Smith and Stuart Samuel Adcock

It is certified that error appears in the above-identified patent and that said Letters Patent are hereby corrected as shown below:

Column 2, line 67 reads "trifluo-", should read -- trifluoro- --; line 68 reads "ing silver nitrate, silver fluoride, silver borofluoride, silver" should read -- acetate, silver bromoacetate, silver benzoate, and the --. Column 3, line 4 reads "roactive acid.", should read -- acetic acid. --; line 37 reads "prefer", should read -- prefer- --.

Signed and sealed this 18th day of July 1972.

(SEAL)
Attest:

EDWARD M. FLETCHER, JR.          ROBERT GOTTSCHALK
Attesting Officer                Commissioner of Patents